W. P. JOYCE AND H. A. FELDT.
PIPE CUTTING WHEEL.
APPLICATION FILED JAN. 17, 1920.
1,374,663.
Patented Apr. 12, 1921.
Fig 1
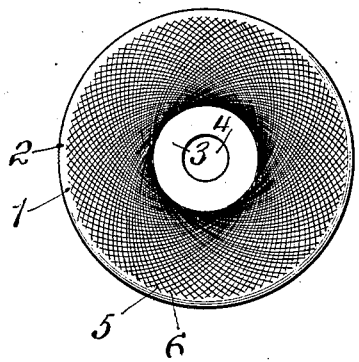
Fig 2
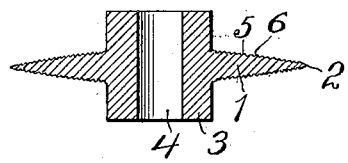
Fig 3
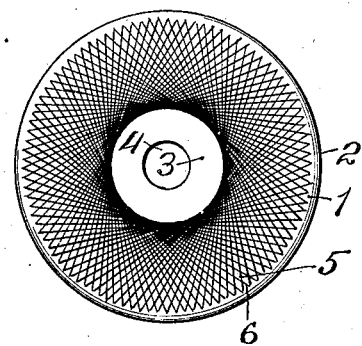
Fig 4
WITNESS:
R.E.Hamilton
INVENTORS.
Walter P. Joyce,
Henning A. Feldt,
BY
Warren W. House.
Their ATTORNEY.

UNITED STATES PATENT OFFICE.

WALTER P. JOYCE AND HENNING A. FELDT, OF KANSAS CITY, MISSOURI.

PIPE-CUTTING WHEEL.

1,374,663. Specification of Letters Patent. Patented Apr. 12, 1921.

Application filed January 17, 1920. Serial No. 352,171.

*To all whom it may concern:*

Be it known that we, WALTER P. JOYCE and HENNING A. FELDT, citizens of the United States, residing at Kansas City, in the county of Jackson and State of Missouri, have invented a certain new and useful Improvement in Pipe-Cutting Wheels, of which the following is a specification.

Our invention relates to improvements in pipe cutting wheels. It is particularly adapted to the ordinary pipe cutting wheel having a circular blade and smooth cutting edge and which is V shape in cross section.

The object of our invention is to provide a pipe cutting wheel which will cut a pipe quickly and easily and which will make a relatively small bur at the cut ends of the pipe and will leave a smooth cut surface.

The novel features of our invention are hereinafter fully described and claimed.

In the accompanying drawing which illustrates the preferred embodiment of our invention.

Figure 1 is a side view of our improved cutting wheel in which the teeth are arcuate.

Fig. 2 is a cross section of the wheel.

Fig. 3 is a side view of our improved wheel in which the file teeth are straight.

Fig. 4 is a diagrammatic view showing portions, enlarged, of the two sets of oppositely facing file teeth.

Similar reference characters designate similar parts in the different views.

1 designates the circular blade of the disk having a smooth cutting edge 2, the disk being provided with the usual central hub 3 having the central axial hole 4 adapted to receive the supporting bolt, not shown, of the usual handle.

Each side of the blade 1 is provided with teeth of file type which extend adjacent to but, preferably, do not reach the cutting edge 2. The teeth on each side preferably comprise two sets 5 and 6 which face oppositely to each other, so that one set of teeth will cut, irrespective of the direction of rotation of the wheel.

In Fig. 1, the teeth are shown as arcuate, while in Fig. 3, the teeth are straight and tangent to the hub 3.

In the operation of our invention, when the wheel is applied with pressure in the usual manner to the pipe, the smooth cutting edge 2 will cut the pipe, and the teeth 5 or 6 will cut away the material against which they bear, thus enabling the cutting edge 2 to more rapidly cut through the pipe, and as part of the material of the pipe is cut away by the file teeth the pressure of the cutting edge does not form as large burs on the cut ends of the pipe as with the ordinary cutting wheel, and the cut surfaces are smooth.

We do not limit our invention to the structure shown and described, as modifications, within the scope of the appended claims, may be made without departing from the spirit of our invention.

What we claim is:—

1. A pipe cutting wheel comprising a circular disk having a cutting edge, the sides of the disk being provided with two sets of file teeth, which cross each other and face in opposite directions and which terminate inside the periphery of the disk.

2. A pipe cutting wheel comprising a circular disk having a cutting edge and a central hub, the sides of the disk being provided with two sets of file teeth which face in opposite directions and which are tangent to the hub and terminate at the inner side of and adjacent to said cutting edge.

3. A pipe cutting wheel comprising a circular blade V-shaped in cross section and having a smooth cutting edge at its periphery, one side of the blade having two sets of file teeth which face in opposite directions and are adjacent to the cutting edge.

In testimony whereof we have signed our names to this specification.

WALTER P. JOYCE.
HENNING A. FELDT.